(12) United States Patent
Farnham

(10) Patent No.: US 11,974,384 B2
(45) Date of Patent: Apr. 30, 2024

(54) CONSUMABLES FOR CUTTING TORCHES

(71) Applicant: The ESAB Group Inc., Florence, SC (US)

(72) Inventor: Jacob Farnham, Lebanon, NH (US)

(73) Assignee: THE ESAB GROUP INC., North Bethesda, MD (US)

( * ) Notice: Subject to any disclaimer, the term of this patent is extended or adjusted under 35 U.S.C. 154(b) by 625 days.

(21) Appl. No.: 16/885,339

(22) Filed: May 28, 2020

(65) Prior Publication Data

US 2021/0378082 A1     Dec. 2, 2021

(51) Int. Cl.
*H05H 1/34* (2006.01)
*B23K 10/00* (2006.01)

(52) U.S. Cl.
CPC ............. *H05H 1/34* (2013.01); *B23K 10/00* (2013.01); *H05H 1/3478* (2021.05)

(58) Field of Classification Search
CPC ......... H05H 1/34; H05H 1/3478; B23K 10/00
See application file for complete search history.

(56) References Cited

U.S. PATENT DOCUMENTS

| | | | |
|---|---|---|---|
| 3,210,586 A | 10/1965 | Clevett, Jr. | |
| 3,463,957 A | 8/1969 | Fuksiewicz | |
| 5,591,356 A * | 1/1997 | Sakuragi | H05H 1/34 219/121.48 |
| 5,796,067 A | 8/1998 | Enyedy | |
| 6,215,089 B1 | 4/2001 | Schwankhart | |
| 6,271,495 B1 | 8/2001 | Rooney | |
| 6,583,378 B1 | 6/2003 | Yamaguchi | |
| 8,525,069 B1 | 9/2013 | Mather et al. | |
| 8,536,481 B2 | 9/2013 | Kong et al. | |
| 8,759,709 B2 | 6/2014 | Mather et al. | |
| 9,597,745 B2 | 3/2017 | Murata et al. | |
| 9,997,322 B2 | 6/2018 | Kong et al. | |
| 2002/0117483 A1 | 8/2002 | Jones | |

(Continued)

FOREIGN PATENT DOCUMENTS

| | | |
|---|---|---|
| CN | 1662338 A | 8/2005 |
| CN | 202411644 U | 9/2012 |

(Continued)

OTHER PUBLICATIONS

Extended European Search Report for European Patent Application No. 21175669.7 dated Oct. 26, 2021, 9 pages.

(Continued)

*Primary Examiner* — Nathaniel E Wiehe
*Assistant Examiner* — Keith Brian Assante
(74) *Attorney, Agent, or Firm* — Edell, Shapiro & Finnan, LLC

(57) ABSTRACT

Consumables for cutting torches include consumables that define a parallel plasma channel and/or a steep, elongated plasma chamber. Additionally, the consumables may define smooth, rounded edges between different geometries of the plasma channel (e.g., at transitions between straight and angles sections) and/or between the plasma channel and the plasma chamber. That is, the consumables may provide a plasma channel that does not converge, diverge, or define any corners and/or a plasma channel that transitions to the plasma chamber without defining any corners.

12 Claims, 8 Drawing Sheets

(56) References Cited

U.S. PATENT DOCUMENTS

| | | | |
|---|---|---|---|
| 2007/0007256 A1* | 1/2007 | Duan | H05H 1/34 219/121.5 |
| 2009/0188898 A1 | 7/2009 | Kong et al. | |
| 2009/0218323 A1 | 9/2009 | Abe et al. | |
| 2010/0125267 A1 | 5/2010 | Lee et al. | |
| 2010/0252536 A1 | 10/2010 | Spencer et al. | |
| 2011/0284502 A1* | 11/2011 | Krink | H05H 1/28 219/121.5 |
| 2012/0138578 A1 | 6/2012 | Wilson | |
| 2013/0043224 A1* | 2/2013 | Leiteritz | H05H 1/34 219/121.52 |
| 2014/0021172 A1 | 1/2014 | Sanders et al. | |
| 2014/0021175 A1 | 1/2014 | Chen | |
| 2015/0334817 A1 | 11/2015 | Namburu | |
| 2016/0101487 A1 | 4/2016 | Ogura et al. | |
| 2017/0064804 A1 | 3/2017 | Namburu | |
| 2019/0246483 A1 | 8/2019 | Namburu | |

FOREIGN PATENT DOCUMENTS

| | | |
|---|---|---|
| CN | 103404237 A | 11/2013 |
| CN | 101554099 B | 3/2014 |
| CN | 106465528 A | 2/2017 |
| EP | 2442625 A2 | 4/2012 |
| EP | 2442625 A3 | 8/2016 |
| JP | 2-290679 A | 11/1990 |
| WO | 8805704 A1 | 8/1988 |
| WO | 2012118826 A1 | 9/2012 |

OTHER PUBLICATIONS

Office Action issued by the China National Intellectual Property Administration dated Jul. 14, 2022 for Chinese Patent Application No. 202110581553.0 with English translation, 20 pages.

Office Action issued by the Canadian Intellectual Property Office dated Oct. 4, 2022 for Canadian Patent Application No. 3,119,142, 5 pages.

Office Action issued by the China National Intellectual Property Administration dated Feb. 23, 2023 for Chinese Patent Application No. 202110581553.0 with English translation, 16 pages.

* cited by examiner

CONSUMABLES FOR CUTTING TORCHES

TECHNICAL FIELD

The present disclosure is directed toward components for welding and cutting torches and, in particular, to consumable components for welding and/or cutting torches.

BACKGROUND

Many welding and cutting torches, such as plasma cutting torches, can receive a variety of consumable components, such as tips/nozzles, electrodes, shields, etc. One example prior art consumable stack 20 is illustrated in FIG. 3. Consumable stack 20 includes an electrode 21, a nozzle 40, a swirl ring 70, and a shield 80. The electrode 21 includes a main body 22 that terminates in a distal end face 26 that defines a cavity 28 for an emissive insert (e.g., a hafnium emissive insert). Additionally, the electrode 21 includes an external surface 30 that faces an inner surface 50 of the nozzle 40 to define a plasma channel 90. The external surface 30 includes a longitudinal portion 32 and a tapered portion 34 that is tapered at an angle A1 of approximately 45° with respect to the longitudinal portion 32. Notably, an upstream edge 35 of the tapered portion defines a hard edge with the longitudinal portion 32 and a downstream edge 36 defines a hard edge with the distal end face 26, at least in between grooves 38 formed thereon.

Meanwhile, the nozzle 40 includes a main body 42 that defines an inner surface 50 with a longitudinal section 52 and a tapered section 60 that are connected by a rounded section 54. The rounded section 54 has a non-constant curvature and extends around and above the tapered portion 34 of the electrode 21 (insofar as "above" refers to an upstream direction along a longitudinal axis of consumable stack 20). That is, an upstream edge 56 of the rounded section 54 of the nozzle 40 is disposed above the upstream edge 35 of the tapered portion 34 of the electrode 21. This creates a hard corner in the plasma channel 90. Additionally, since the rounded section 54 faces a linear, angled tapered portion 34, the plasma gas channel 90 diverges after the hard edge defined by the upstream edge 35 of the tapered portion 34 of the electrode 21. Then, the plasma gas channel 90 converges at or near a downstream edge 58 of the rounded section 54 of the nozzle 40. These convergent and divergent areas, as well as the corner, may cause flow of the plasma gas to separate. That is, these sections and/or the corners in the plasma gas channel 90 may create turbulent flow.

For the purposes of this application, a "plasma gas channel" is defined between a nozzle and an electrode and terminates in a plasma chamber. Thus, in FIG. 3, plasma gas channel 90 terminates at the downstream edge 58 of the rounded section 54 of the nozzle 40 and feeds into plasma chamber 92. The plasma chamber 92 is defined beneath the distal end face 26 of the electrode 21, above an orifice 64 of the nozzle 40, and interiorly of the tapered section 60 of the nozzle 40. In the prior art consumable stack 20 depicted in FIG. 3, the plasma chamber 92 includes an emissive insert catcher 94 defined by a stepped portion 62 of the inner surface 50 of the nozzle 40. As can be seen, the tapered section 60 has a relatively shallow slope defined by taper angle A2, which may measure approximately 55° with respect to a longitudinal axis (i.e., 35° when measured between opposing surfaces of the annular interior surface) so that the emissive insert catcher 94 has a height H2 that spans approximately half of the overall height H1 of the plasma chamber 92. Height H1 may be in the range of 0.090 inches (in.) to 0.180 in.

The plasma chamber 92 terminates at an orifice 64, which extends from the plasma chamber 92 to a distal end 44 of the nozzle 40. Due to the compact height H1 of the plasma chamber 92, the orifice 64 is elongated and has a height H3 of approximately 0.160 inches. In consumable stack 20, plasma gas exiting the orifice 64 is constricted by an axial flow of shield gas that exits the consumable stack 20 via a shield gas path 96 defined between the shield 80 and an outer surface 48 of the nozzle 40.

Generally, consumables, such as the electrode 21 and nozzle 40 included in stack 20, have a limited lifespan and only last for a certain amount of cuts or welds before a user must replace them. Thus, consumables with longer lifespans may save time for a user since a user can continue cutting or welding operations without changing consumables. Additionally, consumables with longer lifespans may provide costs savings for users since a user will not need to purchase replacement consumables as frequently. Thus, consumables with improved lifespans are continuously desired.

SUMMARY

The present disclosure is directed towards consumables for cutting torches. The consumables presented herein define a parallel plasma channel and a steep, elongated plasma chamber. Additionally, the consumables may define smooth, rounded edges between different geometries of the plasma channel (e.g., at transitions between straight and angles sections) and/or between the plasma channel and the plasma chamber. That is, the consumables may provide a plasma channel that does not converge, diverge, or define any corners and/or a plasma channel that transitions to the plasma chamber without defining any corners.

The parallel plasma channel smooths the flow of gas through the plasma channel. Consequently, the plasma gas can be supplied to the consumables at lower pressures than it would otherwise be provided to consumables without these features (e.g., as compared to consumables that defines corners or edges in a plasma channel). Lower gas pressures may create less wear on the consumables, for example by slowing depletion of an emissive insert included in an electrode, and thus, may increase the lifespan of the consumables. Additionally, the lower pressure may decrease gas consumption during cutting, providing further cost savings for a user, among other advantages. Still further, a steeper and/or elongated plasma chamber may encourage plasma gas to flow downwards to the orifice to assist with shielding and constricting an arc, providing further efficiency and cut quality enhancements.

According to one embodiment, a set of consumables for a plasma arc torch presented herein includes an electrode and a nozzle that is installable around the electrode. The electrode includes a main body that extends between a proximal end and a distal end with a distal end face. An external surface of the main body includes a longitudinal portion and a tapered portion. The tapered portion extends between the longitudinal portion and the distal end face and is connected to the longitudinal portion by a transition portion that provides a smooth, rounded transition between the longitudinal portion and the tapered portion. The nozzle includes a main body defined, at least in part, by an outer surface and an inner surface, the inner surface being disposed opposite the tapered portion of the electrode, the transition portion of the electrode, and at least a portion of the longitudinal portion of the electrode to define a plasma gas channel therebetween. The plasma gas channel has a constant cross-sectional area.

In at least some instances, the tapered portion of the electrode is a truncated cone (i.e., a truncated cone portion). For example, the electrode may have a tapered portion that is a truncated cone with a taper angle in the range of 30 to 60 degrees. Additionally or alternatively, the tapered portion may connect to the distal face at a hard edge. In at least some of these embodiments, the hard edge includes radial grooves spaced around a circumference of the hard edge that provide a secondary taper between the tapered portion and the distal face.

Moreover, in some instances, an upstream edge of the transition portion of the electrode provides a tangential transition to the longitudinal portion and a downstream edge of the transition portion provides a tangential transition to the tapered portion. Additionally or alternatively, the inner surface of the nozzle mirrors the shape of the tapered portion of the electrode, mirrors the transition portion of the electrode, and mirrors at least a portion of the longitudinal portion of the electrode.

Still further, in some instances, the inner surface of the nozzle includes a longitudinal section, a rounded section, and a tapered section. When the nozzle is installed around the electrode, the longitudinal section of the nozzle is longitudinally aligned with the longitudinal portion of the electrode, the rounded section of the nozzle is longitudinally aligned with the transition portion of the electrode, and the tapered section of the nozzle is longitudinally aligned with the tapered portion of the electrode. In at least some of these embodiments, the tapered portion is a truncated cone with a constant cone angle in the range of 30 to 60 degrees. Additionally or alternatively, the tapered section of the nozzle may extend beyond the distal face of the electrode to define an elongated plasma chamber therebetween.

According to another embodiment, an electrode is presented herein that includes a main body that extends between a proximal end and a distal end with a distal end face. The main body includes an external surface that includes a longitudinal portion, a truncated conical portion, a transition portion, and a hard edge. The truncated conical portion extends between the longitudinal portion and the distal end face. The transition portion that connects the truncated conical portion to the longitudinal portion defines a smooth, rounded transition between the longitudinal portion and the tapered portion. The hard edge is defined between the truncated conical portion and the distal end face.

According to yet another embodiment, a nozzle (also referred to as a tip) is presented herein and includes a main body defined, at least in part, by an outer surface and an inner surface. The inner surface includes a longitudinal section, a tapered section, and a rounded section. The tapered section has a truncated conical shape with a constant cone angle in the range of 30 to 60 degrees. The rounded section connects the longitudinal section to the tapered section, and the longitudinal section, the rounded section, and a first portion of the tapered section cooperate with an electrode around which the nozzle is installed to define a plasma channel therebetween. Additionally, a second portion of the tapered section extends beyond the electrode to define an elongated plasma chamber downstream of the electrode.

In at least some instances, the nozzle further comprises an orifice and the tapered section extends directly to the orifice to define the elongated plasma chamber. Alternatively, the nozzle further comprises an orifice and a stepped portion that defines an emissive insert catcher. In the latter instances, the stepped portion may be disposed between the orifice and the tapered section so that the tapered section extends directly to the stepped portion and a bottom of the elongated plasma chamber is defined by a bottom of the emissive insert catcher.

Other systems, methods, features and advantages will be, or will become, apparent to one with skill in the art upon examination of the following figures and detailed description. All such additional systems, methods, features and advantages are included within this description, are within the scope of the claimed subject matter.

BRIEF DESCRIPTION OF THE SEVERAL VIEWS OF THE DRAWINGS

The consumables for a plasma arc torch presented herein may be better understood with reference to the following drawings and description. It should be understood that the elements in the figures are not necessarily to scale and that emphasis has been placed upon illustrating the principles of the consumables. In the figures, like-referenced numerals designate corresponding parts throughout the different views.

DETAILED DESCRIPTION

A consumable stack for cutting torches and/or individual consumables for a consumable stack intended for cutting torches are presented herein. The consumables presented herein define a parallel plasma channel and a steep, elongated plasma chamber. Additionally, the consumables may define smooth, rounded edges between different geometries of the plasma channel (e.g., at transitions between straight and angles sections) and/or between the plasma channel and the plasma chamber. That is, the consumables may provide a plasma channel that does not converge, diverge, or define any corners and/or a plasma channel that transitions to the plasma chamber without defining any corners (i.e., a plasma channel with a constant cross-sectional area).

Figure 1A:
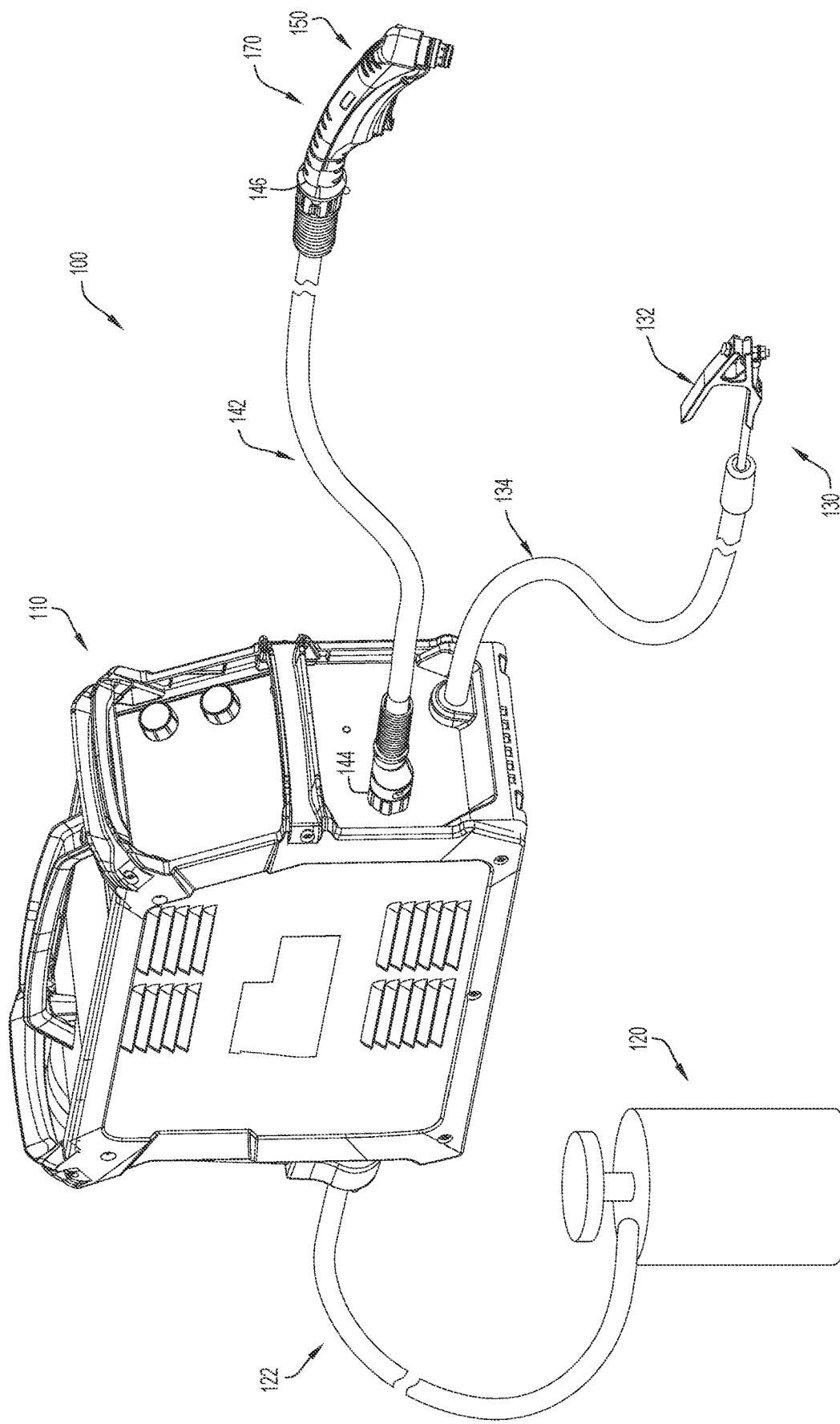
FIG. 1A is a perspective view of a manual cutting system including a power source and torch assembly with which the consumables presented herein may be utilized, according to an example embodiment of the present disclosure.

FIG. 1A illustrates an example embodiment of a manual cutting system 100 that may utilize the consumable components presented herein. At a high-level, the manual cutting system 100 includes a power supply 110 and a torch assembly 140. The power supply 110 is configured to supply (or at least control the supply of) power and gas to a torch 150 included in the torch assembly 140 via torch lead 142 (also referred to as cable hose 142). For example, the power supply 110 may meter a flow of gas received from a gas supply 120, which the power supply 110 receives via cable hose 122, before or as the power supply 110 supplies gas to the torch 150 via cable hose 142.

The manual cutting system 100 also includes a working lead assembly 130 with a grounding clamp 132 that is connected to the power supply by a work lead 134 (also referred to as cable hose 134). As illustrated, cable hose 122, cable hose 134, and cable hose 142 may each be any length. Moreover, each end of cable hose 122, cable hose 134, and cable hose 142 may be connected to components of the manual cutting system 100 via any connectors now known or developed hereafter (e.g., via releasable connectors). For example, torch 150 may be connected to a distal end of cable hose 142 via a quick disconnect connector 146 and power supply 110 may be connected to a proximal end of cable hose 142 via a quick disconnect connector 144.

Figure 1B:
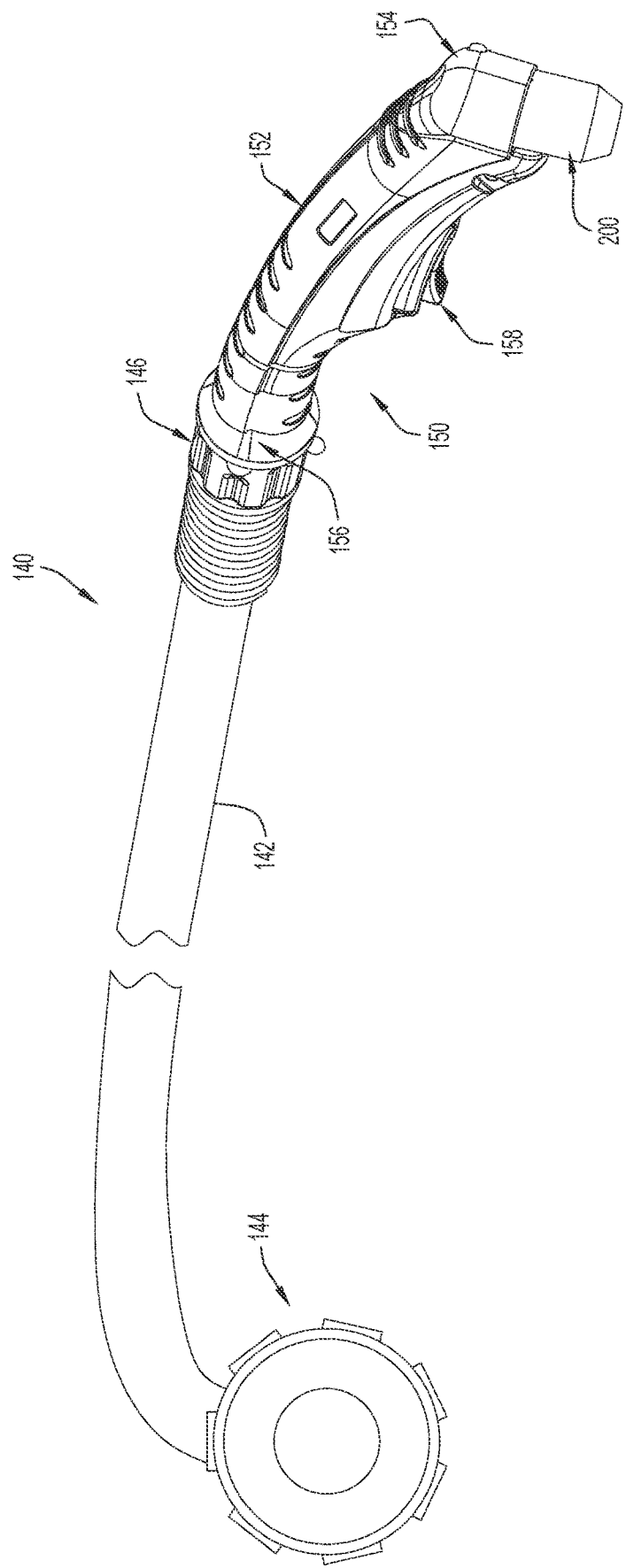
FIG. 1B is a perspective of the torch assembly of FIG. 1.

FIG. 1B illustrates the torch assembly 140 of FIG. 1A independently from the power supply 110. As can be seen, the torch 150 includes a torch body 152 that extends from a first end 156 (e.g., a connection end 156) to a second end 154 (e.g., an operating or operative end 154). The torch body 152 may also include a trigger 158 that allows a user to initiate cutting operations in any manner now known or developed hereafter (e.g., in a 2T or 4T mode). As mentioned above, the connection end 156 of the torch body 152 may be coupled (in any manner now known or developed hereafter) to one end of lead 142 Meanwhile, the operative end 154 of the torch body 152 may receive interchangeable components, such as consumable components that facilitate cutting operations. The consumable stack presented herein, which is depicted installed on torch 150 in FIG. 2, is generally referred to as consumable stack 200 in FIG. 2; however, this is merely representative of a consumable stack that includes the features presented herein (which are also shown in consumable stack 301 and consumable stack 302).

Figure 2:
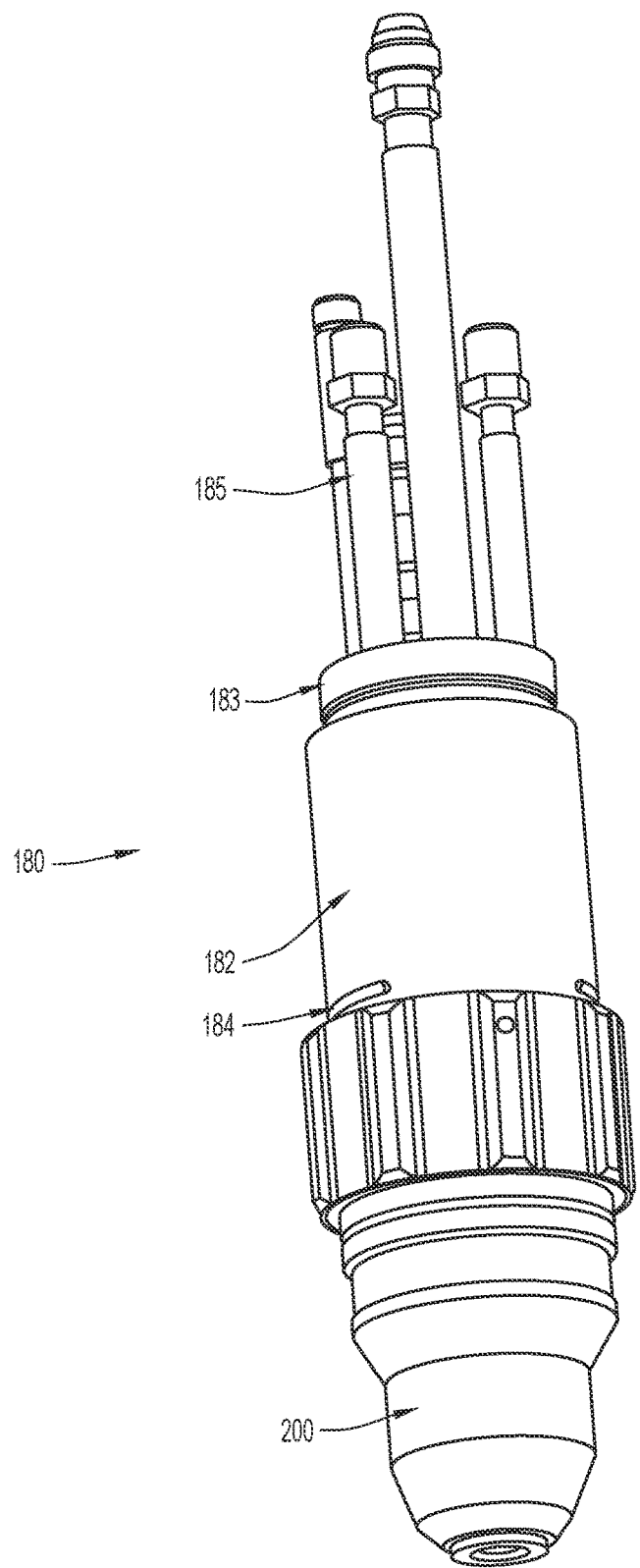
FIG. 2 is a perspective view of an automated cutting head with which the consumables presented herein may be utilized, according to an example embodiment of the present disclosure.

FIG. 2 illustrates an example embodiment of an automated cutting head 180 that may utilize the consumable components presented herein. As can be seen, the cutting head 180 includes a body 182 that extends from a first end 183 (e.g., a connection end 183) to a second end 184 (e.g., an operating or operative end 184). The connection end 183 of the body 182 may be coupled (in any manner now known or developed hereafter) to an automation support structure (e.g., a cutting table, robot, gantry, etc.) and conduits 185 extending therefrom may be coupled to like conduits in the automation support structure to connect the automated cutting head 180 to a power supply, a gas supply, a coolant supply, and/or any other components supporting automated cutting operations. Meanwhile, the operative end 184 of the body 182 may receive interchangeable components, such as consumable components that facilitate cutting operations. The consumable stack presented herein, which is depicted installed on automated cutting head 180 in FIG. 2, is generally referred to as consumable stack 200 in FIG. 2 (like in FIG. 1B); however, again, this is merely representative of a consumable stack that includes the features presented herein (which are also shown in consumable stack 301 and consumable stack 302).

For simplicity, FIGS. 1A, 1B, and 2 do not illustrate an interior of torch body 152 or body 182. However, it is to be understood that any unillustrated components that are typically included in a torch, such as components that facilitate welding or cutting operations, may (and, in fact, should) be included in a torch configured in accordance with an example embodiment of the present invention. Additionally, none of FIGS. 1A, 1B, and 2, nor the remaining figures, illustrate connections between the bodies 152/182 and the consumable stack 200 in detail; however, it should be understood that a consumable stack including the features or components presented therein, or components thereof, may be secured or affixed to the torch body 152 and/or body 182 in any desirable manner. For example, the consumable stack, or components thereof, could be coupled to a torch by mating threaded sections included on the torch body 152 or body 182 with corresponding threads included on one or more components of the consumable stack 200 (or of consumable stack 301, consumable stack 302, or another embodiment).

Figure 4:
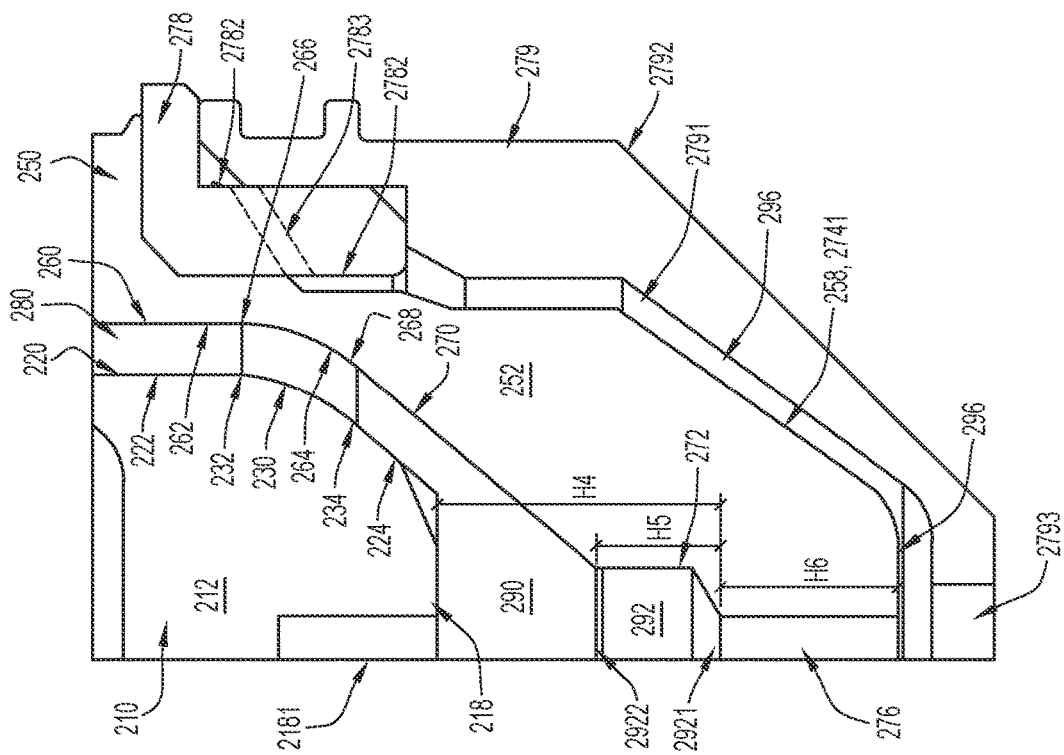
FIG. 4 is a partial sectional view of at least a portion of a consumable stack according to a first example embodiment of the present disclosure.

Now turning to FIG. 4, this Figure illustrates a first example embodiment of a consumable stack 200 including the features presented herein. As can be seen in FIG. 4, which is juxtaposed with the prior art consumable stack 20 illustrated in FIG. 3, consumable stack 200 includes a similar overall structure to the prior art consumable stack 20, but a number of different features (e.g., different geometries). For example, consumable stack 200 includes an electrode 210, a nozzle 250, a shield swirl ring 278, and a shield 279 that define a plasma gas channel 280, an elongated plasma chamber 290, and a shield gas channel 96. However, and perhaps most notably, the plasma gas channel 280 and the elongated plasma chamber 290 are geometrically different from the plasma gas channel 90 and the plasma chamber 92 of the prior art consumable stack 20. This is, the electrode 210 and the nozzle 250 including different geometries than electrode 21 and nozzle 40 and, thus, define a plasma gas channel 280 and an elongated plasma chamber 290 that are geometrically different from the plasma gas channel 90 and the plasma chamber 92.

Figure 5B:
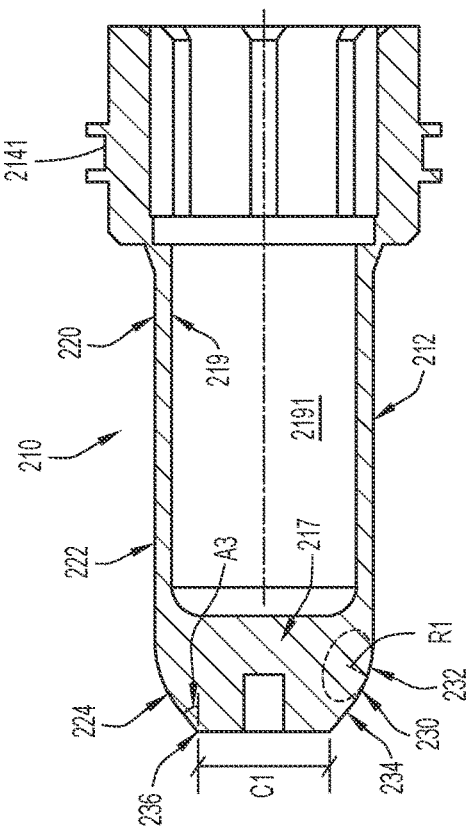
FIG. 5B is a sectional view of the electrode of FIG. 5A taken along line B-B.
Figure 5C:
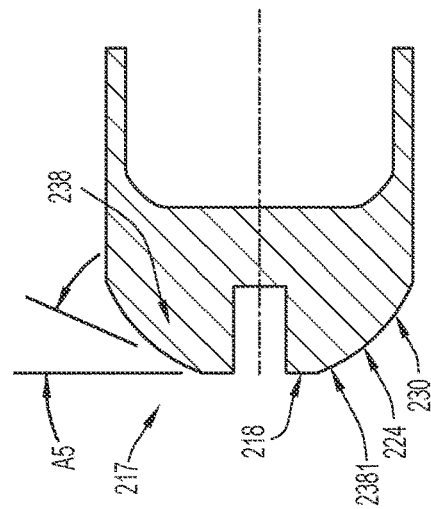
FIG. 5C is a partial sectional view of the electrode of FIG. 5A taken along line C-C.
Figure 5A:
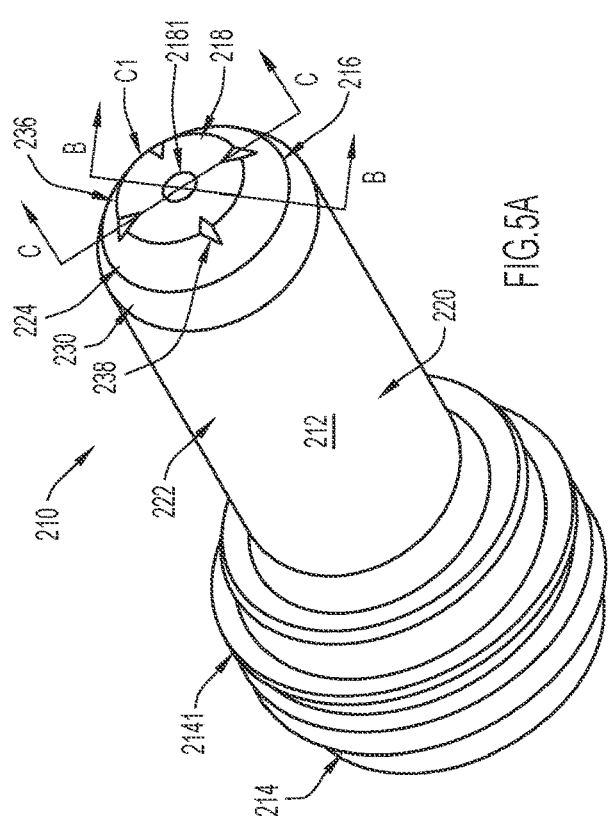
FIG. 5A is a perspective view of an electrode included in the consumable stack of FIG. 4

More specifically, and now referring to FIG. 4 in combination with FIGS. 5A-C, in consumable stack 200, the electrode 210 includes a main body 212 that includes an internal surface 219 and an external surface 220. The internal surface 219 defines an internal chamber 2191 that may receive and circulate coolant to cool the electrode 210 (see FIG. 5B). The external surface 220 extends from a proximal end 214 of the electrode 210 to a distal end 216 of the electrode 210 (see FIG. 5A). A flange 2141 extends from the proximal end 214 and facilitates attachment of the electrode 210 to torch 150 and/or other consumables in any manner now known or developed hereafter. The flange 2141 may also define, or at least partially define, gas channels within the consumable stack 200 in any manner now known or developed hereafter. Meanwhile, a distal end portion 217 extends from the distal end 216 of the electrode 210 and cooperates with the nozzle 250 to define the plasma gas channel 280 and the elongated plasma chamber 290 (see FIG. 4).

First, and now turning back to FIG. 4, but with continued reference to FIGS. 5A-C, the external surface 220 of the distal end portion 217 cooperates with the nozzle 250 to define the plasma gas channel 280. The external surface 220 of electrode 210 is similar to the external surface 30 of the electrode 21 from the prior art consumable stack 20 in that it includes a longitudinal portion 222 and a tapered portion 224. In fact, in the depicted embodiment, the tapered portion 224 is a truncated cone with a taper angle A3 in the range of 20° to 40°, 25° to 35°, or even 27° to 32° with respect to the longitudinal portion 222 (like tapered portion 34). For example, the tapered portion 224 may have a taper angle A3 of approximately 40°. Consequently, the exterior surface of the tapered portion 224 is a linear, but angled, surface. However, in other embodiments, the tapering might include multiple taper angles, curvature, or any desired tapering (i.e., narrowing) from its upstream edge (the edge adjacent transition portion 230) to its downstream edge (the edge adjacent distal end face 218).

However, and in contrast with tapered portion 34, the tapered portion 224 is not connected to the longitudinal portion 222 at a hard edge. Instead, a transition portion 230 connects the longitudinal portion 222 to the tapered portion 224 and forms a smooth, rounded transition therebetween. That is, the transition portion 230 has an upstream edge 232 that provides a tangential transition (i.e., connects tangentially) to the longitudinal portion 222 and a downstream edge 234 that provides a tangential transition (i.e., connects tangentially) to the tapered portion 224.

As is illustrated in FIG. 5B, in at least some embodiments, the transition portion 230 has a constant radius R1 in the range of 0.04 inches (in.) to 0.15 in., the range of 0.04 in. to 0.10 in., or the range of 0.04 in to 0.06 in. For example, transition portion 230 may have a constant radius R1 of approximately 0.125 inches. However, in other embodiments, the transition portion 230 may be a portion of an ellipse or otherwise have a changing radius of curvature, provided it provides a smooth, rounded transition between the longitudinal portion 222 and the tapered portion 224. That is, the transition portion 230 may have any desirable convex curvature to provide a smooth, rounded transition between the longitudinal portion 222 and the tapered portion 224. The smooth, rounded transition to the tapered portion 224 may reduce turbulence in a boundary layer of gas flowing along the plasma gas channel 280 from the longitudinal portion 222 to the tapered portion 224. The reduced turbulence improves flow and allows the gas pressure of the plasma gas to be reduced as compared to the pressure of gas used with consumables that define a plasma gas channel that generates a turbulent boundary layer. This will increase the lifespan of the consumables while also reducing gas consumption.

Still referring to FIG. 4 in combination with FIGS. 5A-C, as mentioned, the distal end portion 217 also cooperates with the nozzle 250 to define the elongated plasma chamber 290. Specifically, the distal end portion 217 includes a distal end face 218 that cooperates with the nozzle 250 to define the elongated plasma chamber 290. The distal end face 218 is centered on an emissive insert cavity 2181 that is sized and shaped to receive an emissive insert (e.g., hafnium or tungsten) in any manner now known or developed hereafter. Additionally, the distal end face 218 is bounded by a hard edge 236, which has an angle defined by the taper angle A3 of the tapered portion 224 (since the distal end face 218 is a substantially flat face that extends perpendicular to the longitudinal axis of the consumable stack 200). For example, if measured interiorly (e.g., within the electrode 210), an angle between the tapered portion 224 and the distal end face 218 may be the taper angle A3 plus 90°, so that, for example, if taper angle A3 measures 40°, the hard edge may have an interior angle of 130°. Thus, based on the ranges of the taper angle A3 laid out above, the hard edge 236 may have an interior angle in the range in the range of 120° to 135°, the range of 123° to 132°, or even the range of 126° to 130°.

The hard edge 236 generally defines a circumference C1 of the distal end face 218; however, the hard edge 236 need not define a complete or continuous circumference. For example, in the depicted embodiment, grooves 238 extend through the hard edge 236 so that the hard edge 236 defines a number of arc portions of the circumference C1 of the distal end face 218. Nevertheless, the hard edge 236 generally defines the bounds of the distal end face 218, which may have a diameter in the range of 0.2 in. to 0.25 in., the range of 0.175 in. to 0.5 in., or the range of 0.15 in to 0.3, such as approximately 0.221 in. In the depicted embodiments, four grooves 238 are shown spaced around circumference C1; however, in other embodiments, any number of grooves 238 might be spaced around circumference C1.

As can be seen in FIG. 5C, which is a sectional view taken through two of grooves 238, each of the grooves 238 provides a break in the hard edge 236 and a bottom of each of the grooves 238 provides a secondary tapered section 2381 between the tapered portion 224 and the distal end face 218. The secondary tapered section 2381 extends radially inwardly of the hard edge 236 and, thus, in the sectional view of FIG. 5C, the distal end face 218 appears smaller than its circumference C1. The second tapered section 2381 may have a taper angle A5 that is shallower (e.g., less than) the taper angle A3 of the tapered portion 224. For example, taper angle A5 may be in the range of 20° to 25°, the range of 15° to 30°, or even the range of 10° to 35°, such as approximately 23°. The shallow taper angle A5 may serve to, in essence, meter plasma gas towards an emissive insert disposed in emissive insert cavity 2181 and generate a high-quality arc while preserving the life of the electrode 210.

Figure 6B:
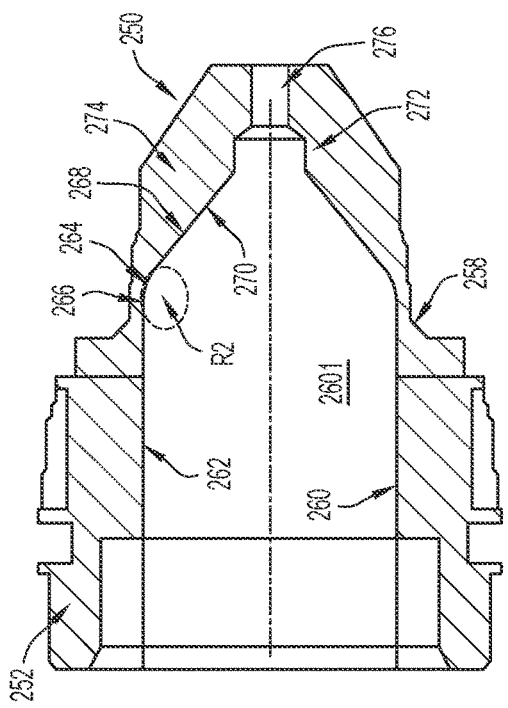
FIGS. 6B and 6C are a sectional view and a partial sectional view, respectively, of the nozzle of FIG. 6A.
Figure 6C:
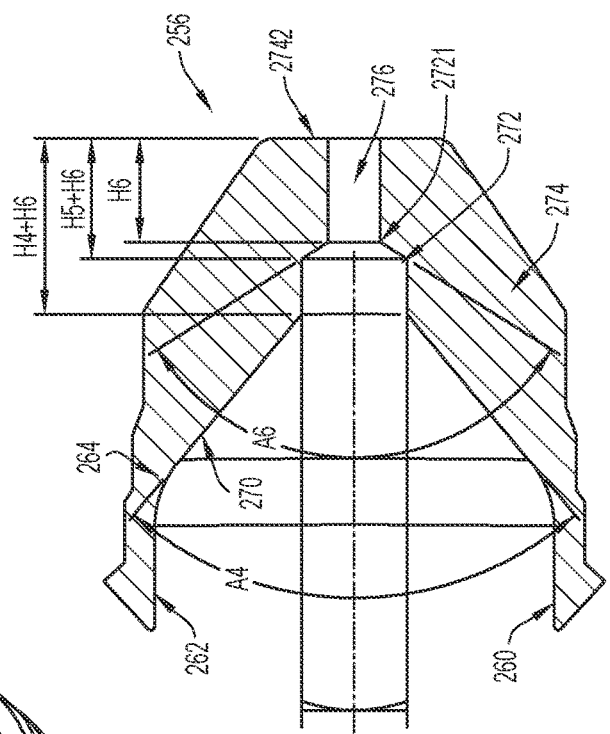
Figure 6A:
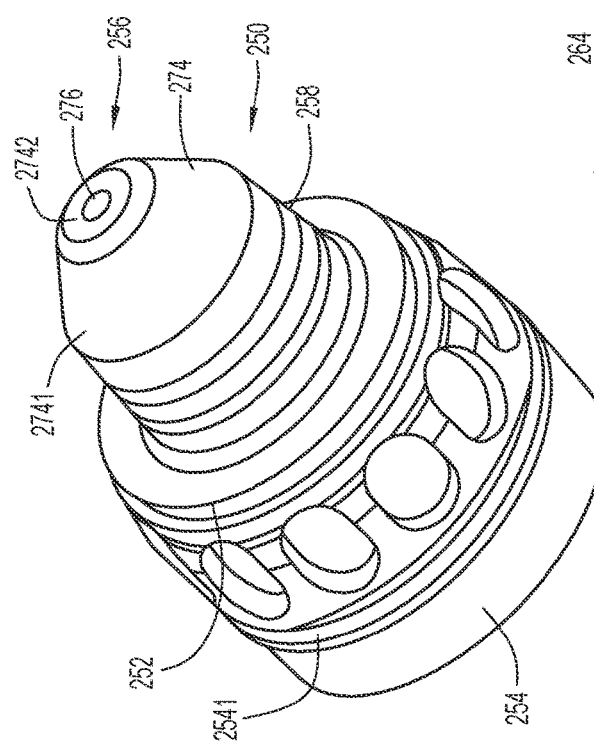
FIG. 6A is a perspective view of a nozzle included in the consumable stack of FIG. 4

Still referring to FIG. 4, but now in combination with FIGS. 6A-6C, the nozzle 250, which may also referred to as tip 250, has a main body 252 that extends from a proximal end 254 to a distal end 256. The proximal end 254 has a flange 2541 that facilitates attachment of the nozzle 250 to torch 150 and/or other consumables in any manner now known or developed hereafter. The flange 2541 may also define, or at least partially define, gas channels within the consumable stack 200 in any manner now known or developed hereafter. The main body 252 also includes an outer surface 258 and an inner surface 260, as shown in at least FIG. 6B. The inner surface 260 defines an interior chamber 2601 that is sized to receive the electrode 210. In particular, the interior chamber 2601 is sized to receive the electrode 210 while maintaining spacing between the main body 212 of the electrode 210 and the main body 252 of the nozzle 250 so that the plasma gas channel 280 and the elongated plasma chamber 290 can be formed or defined therebetween.

Generally, the inner surface 260 of the nozzle 250 mirrors or mimics the shape of the external surface 220 of the electrode 210. That is, at least a portion of the inner surface 260 of the nozzle 250 is contoured to be parallel to the external surface 220 of the electrode 210. To that end, the inner surface 260 includes a longitudinal section 262, a rounded section 264, and a tapered section 270. As is shown in FIG. 4, installing the nozzle 250 around the electrode 210 causes: (1) the longitudinal section 262 of the nozzle 250 to mirror at least a portion of the longitudinal portion 222 of the electrode 210; (2) the rounded section 264 of the nozzle 250 to mirror the transition portion 230 of the electrode 210; and (3) at least a portion of the tapered section 270 of the nozzle 250 to mirror the tapered portion 224 of the electrode 210.

This creates a plasma gas channel 280 with parallel walls and a constant cross-sectional area (the cross-section may be an annular shape).

Notably, the rounded section 264 of the nozzle 250 does not extend above or below the transition portion 230 of the electrode 210 and, thus, no corners are formed or defined along the boundaries of the plasma gas channel 280. Instead, an upstream edge 266 of the rounded section 264 is longitudinally aligned with the upstream edge 232 of the transition portion 230 of the electrode 210 and a downstream edge 268 of the rounded section 264 is longitudinally aligned with the downstream edge 234 of the transition portion 230 of the electrode 210. In turn, this alignment aligns the longitudinal section 262, the rounded section 264, and the tapered section 270 of the nozzle 250 with the longitudinal portion 222, the transition portion 230, and the tapered portion 224 of the electrode 210, respectively.

This alignment ensures that the plasma gas channel 280 does not include or define any corners or irregular boundaries that might create turbulence (i.e., separate flow). By comparison, in the prior art consumable stack 20 of FIG. 3, the rounded section 54 of the nozzle 40 of extends above the tapered portion 34 of the electrode 21, which creates a corner in the plasma channel 90. Moreover, the rounded section 264 of the nozzle 250 is similar to the transition portion 230 of the electrode 210 in that in provides a smooth, rounded transition. That is, the upstream edge 266 of the rounded section 264 provides a tangential transition (i.e., connects tangentially) to the longitudinal section 262 of the inner surface 260 of the nozzle 250 and the downstream edge 268 of the rounded section 264 provides a tangential transition (i.e., connects tangentially) to the tapered section 270.

The rounded section 264 may have a radius R2 that matches the radius R1 of the transition portion 230 of the electrode 210. Thus, in at least some embodiments, R2 may be a constant radius in the range of 0.05 in. to 0.15 in., the range of 0.07 in. to 0.12 in., or the range of 0.09 in to 0.11, such as a constant radius of approximately 0.10 inches. Alternatively, in other embodiments, the rounded section 264 may be a portion of an ellipse or otherwise have a changing radius of curvature, provided it provides a smooth, rounded transition between the longitudinal section 262 and the tapered section 270 that matches or mirrors the transition portion 230 of the electrode 210. That is, the rounded section 264 may have any desirable convex curvature to provide a smooth, rounded transition between the longitudinal section 262 and the tapered section 270 that matches or mirrors the transition portion 230 of the electrode 210. The smooth, rounded transition may cooperate with the transition portion 230 of the electrode 210 to reduce turbulence gas flowing along the plasma gas channel 280. As mentioned above, a reduction in turbulence may improve flow and allow the gas pressure of the plasma gas to be reduced as compared to the pressure of gas used with consumables that define a plasma gas channel that generates a turbulent boundary layer. This will increase the lifespan of the consumables while also reducing gas consumption.

Still referring to FIG. 4 in combination with FIGS. 6A-C, as mentioned, the tapered section 270 of the nozzle 250 may define a truncated cone with a cone angle that matches a truncated cone shape of the tapered portion 224 of the electrode 210. For example, if the tapered portion 224 has a taper angle A3 of approximately 40°, the tapered section 270 may define an edge-to-edge interior angle A4 of approximately 80°, so that each face of the tapered section 270 is sloped approximately 40° with respect to a longitudinal axis. Consequently, an edge-to-edge interior angle A4 may be in the range of 60° to 100°, the range of 70° to 90°, or even the range of 60° to 120° to define sloped surfaces in the range of 30° to 50°, the range of 35° to 45°, or even the range of 30° to 60° to match the angle of the tapered portion 224 of the electrode 210 (which, as mentioned above, may have a taper angle A3 in the range of 30° to 50°, the range of 35° to 45°, or even the range of 30° to 60° with respect to the longitudinal portion 222). Moreover, although the tapered portion 224 and the tapered section 270 are illustrated as linear, angled surfaces; both surfaces might include multiple taper angles, curvature, or any other desired tapering (i.e., narrowing) from their upstream edges to their downstream edges, provided that the tapered section 270 of the nozzle 250 matches (e.g., mirrors or mimics) the tapered portion 224 of the electrode 210.

Still referring to FIGS. 4 and 6C, the tapered section 270 of the nozzle 250 may lead to or terminate at an orifice 276 defined by a distal end portion 274 of the main body 252. In at least some embodiments, such as the embodiments depicted in FIGS. 4-6C, the tapered section 270 is connected to the orifice 276 via a stepped portion 272 that defines an emissive insert catcher 292. An angled bottom surface 2721 of the stepped portion 272 may have an edge-to-edge interior angle A6 that defines a second taper that is shallower (i.e., less steep) than the taper angle defined by the edge-to-edge interior angle A4 (i.e., angle A6 may be greater than angle A4, creating less slope). For example, interior angle A6 may be in the range of 90° to 130°, the range of 100° to 120°, or even the range of 90° to 150° to define sloped surfaces in the range of 45° to 65°, the range of 50° to 60°, or even the range of 45° to 75°, provided A6 is larger than A4. As a specific example, if edge-to-edge interior angle A4 is approximately 80°, edge-to-edge interior angle A6 may be approximately 110°.

Still referring to FIGS. 4 and 6C, as mentioned, the distal end face 218 of the electrode 210 and the tapered section 270 of the nozzle 250 define or bound, at least in part, the elongated plasma chamber 290. Specifically, a portion of the tapered section 270 of the nozzle 250 (e.g., a second portion of the tapered section 270) may extend beyond the distal end face 218 of the electrode 210 to define at least a portion of the lateral boundaries of the elongated plasma chamber 290. Meanwhile, the distal end face 218 of the electrode 210 may define a top of the elongated plasma chamber 290.

As mentioned, the emissive insert catcher 292 may, at least for the purposes of this application, be considered part of the elongated plasma chamber 290. Thus, a height H4 of the elongated plasma chamber 290 may be measured as the distance between the distal end face 218 of the electrode 210 and a bottom 2921 of the emissive insert catcher 292. The height H4 of the elongated plasma chamber 290 may be in the range of 0.115 in. to 0.165 in., such as approximately 0.150 in., and may be elongated as compared to the height H1 of the plasma chamber 92 of the prior art consumable stack 20 shown in FIG. 3, which may be in the range of 0.110 in. to 0.160 in., such as approximately 0.140 in.

The steep angle of the tapered section 270 (defined by angle A4) may be the primary driver of the elongation of the elongated plasma chamber 290, but the tapered section 270 does not only elongate the elongated plasma chamber 290. Due to its steep angle, the tapered section 270 also reduces the amount of plasma gas that is diverted axially as it enters the plasma chamber 290. That is, since the tapered section 270 is steep, plasma gas moving from the plasma gas channel 280 to the plasma chamber 290 can continue flowing primarily longitudinally and only a minimal portion of the plasma gas will be diverted axially, which will smooth the flow of plasma gas.

By comparison, when a plasma chamber has a lateral wall with a shallow angle, like the tapered section 60 of the nozzle 40 from the prior art consumable stack 20, which has a taper angle A2 of approximately 55 degrees, approximately half of the plasma gas flow is diverted axially, creating turbulence in the plasma gas that reduces consumable lifespan. Moreover, a tapered section 270 with a steep, constant taper angle does not create any boundary irregularities (e.g., corners) that might generate turbulence. That is, since the tapered section 270 of the nozzle 250 is, in at least some embodiments, linear with a steep taper angle, it will encourage or funnel plasma gas towards the orifice 276. Generally, a smaller taper angle might allow flow to converge slower than the flow would converge with a larger taper angle that might abruptly alter a direction of flow.

Figure 3:
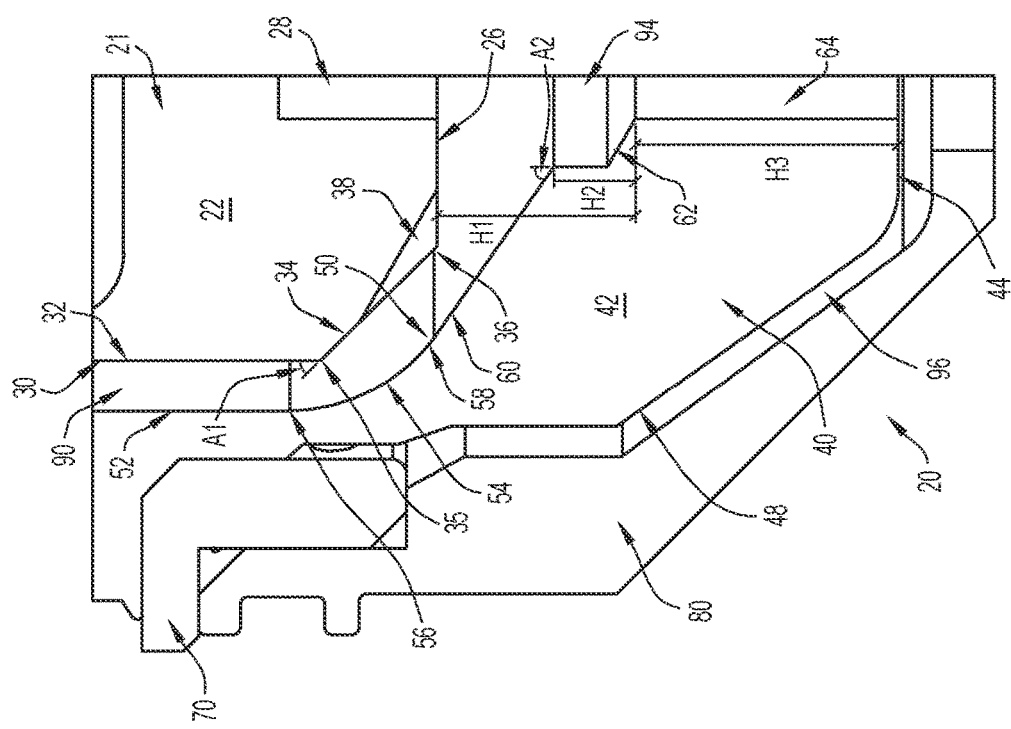
FIG. 3 is a partial sectional view of a prior art consumable stack.

Still referring to FIGS. 4 and 6C, the consumables included in stack 200 may also elongate the emissive insert catcher 292 and shorten the orifice, at least as compared to the prior art consumable stack 20 shown in FIG. 3. That is, the emissive insert catcher 292 may have a height H5, measured from a bottom 2921 of the emissive insert catcher 292 to a top 2922 of the emissive insert catcher 292, that is longer than the height H2 of the emissive insert catcher 94 of the prior art consumable stack 20 shown in FIG. 3. The height H5 may be in the range of 0.040 in. to 0.080 in., such as approximately 0.060 in. Meanwhile, the orifice 276 may have a height H6, measured from a distal end surface 2742 of the distal end portion 274 of the nozzle 250 to the bottom 2921 of the emissive insert catcher 292, that is shorter than the height H3 of the orifice 64 of the prior art consumable stack 20 shown in FIG. 3. The height H6 may be in the range of 0.080 in. to 0.180 in., such as approximately 0.155 in.

Among other advantages, lengthening the emissive insert catcher 292 may smooth flow approaching the orifice 276. This is because the lengthened emissive catcher 292 elongates the space in which air flow may merge or condense before flowing through the orifice 276, which defines a smaller, more restrictive passageway than areas above the orifice 276. Increasing the space for convergence may smooth the flow. Meanwhile, shortening the orifice 276 may provide improved thermal management because a smaller surface area is exposed to the arc; however, the decrease in surface area must also be balanced against heat resistance concerns.

Now turning back to FIG. 4 alone, in various embodiments, the depicted electrode 210 and nozzle 250, as well as variations thereof, may be connected to, assembled with, or otherwise used with any number of other components. For example, the electrode 210 and/or the nozzle 250 may be included in a cartridge (e.g., a cartridge that cannot be disassembled) with other consumable components and/or non-consumable components. Alternatively, as another example, electrode 210 and/or the nozzle 250 could be sold and/or manufactured as individual components and could be installable onto torch 150 with any other consumable components and/or non-consumable components. In FIG. 4, the electrode 210 and the nozzle 250 are shown with a shield swirl ring 278 and a shield 279.

The shield swirl ring 278 includes an outer surface 2782 that can be aligned with a shield gas supply and/or a shield gas passageway and an inner surface 2781 that is connected to the outer surface 2782 via swirl holes 2783. The shield 279 sits around the shield swirl ring 278 and the nozzle 250, and has an inner surface 2791 that is spaced from an outer guide surface 2741 of the nozzle 250 to define a shield gas channel 296 that can receive gas from the shield swirl ring 278. The shield 279 also defines an orifice 2793 and an outer surface 2792. The outer surface 2792 may protect the nozzle 250 from molten splatter during cutting and the orifice 2793 may align, but be radially larger than, the orifice 276 of the nozzle 250 to allow plasma to exit the elongated plasma chamber 290 via the orifice 2793 while protected and/or constricted by shield gas exiting shield gas channel 296.

Figure 7:
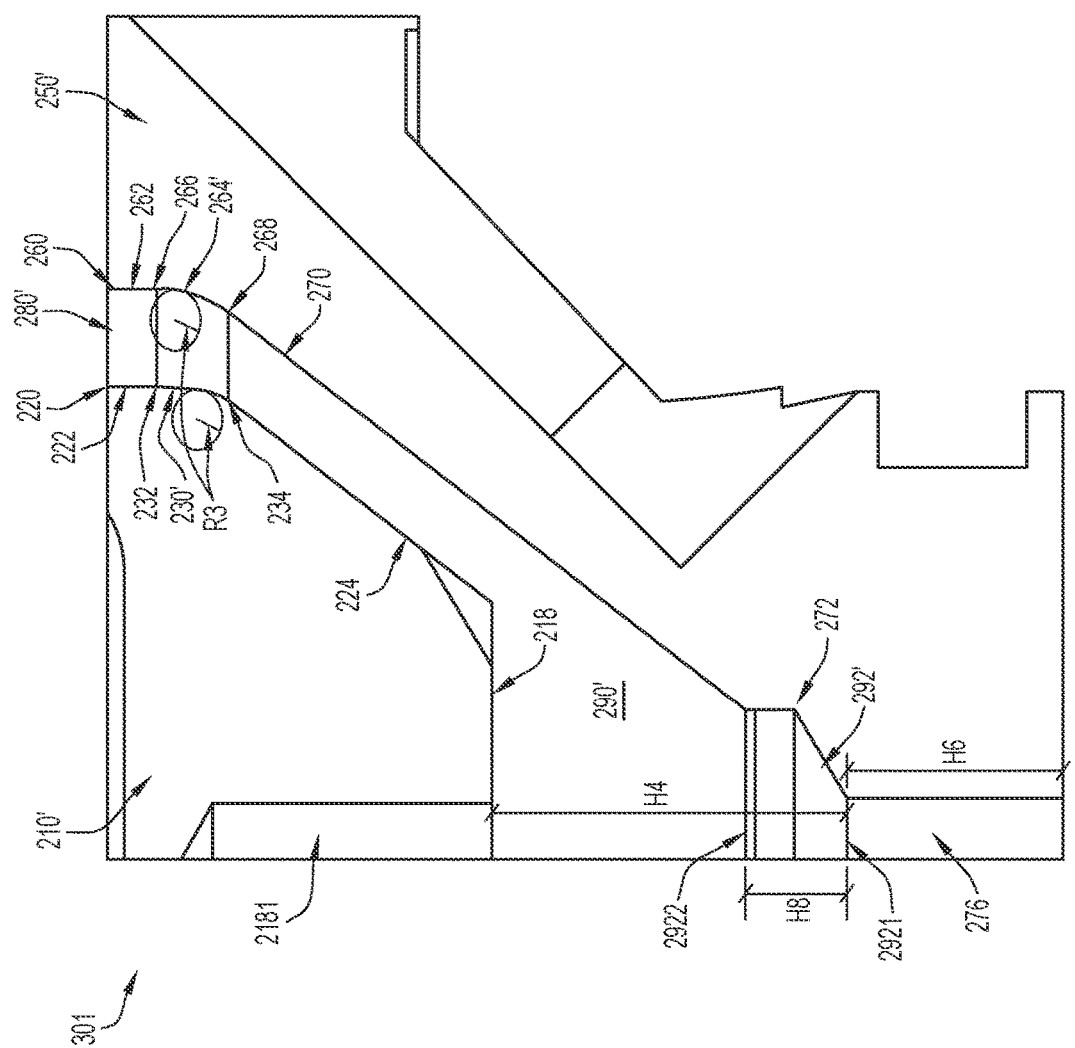
FIG. 7 is a partial sectional view of at least a portion of a consumable stack according to a second example embodiment of the present disclosure.
Figure 8:
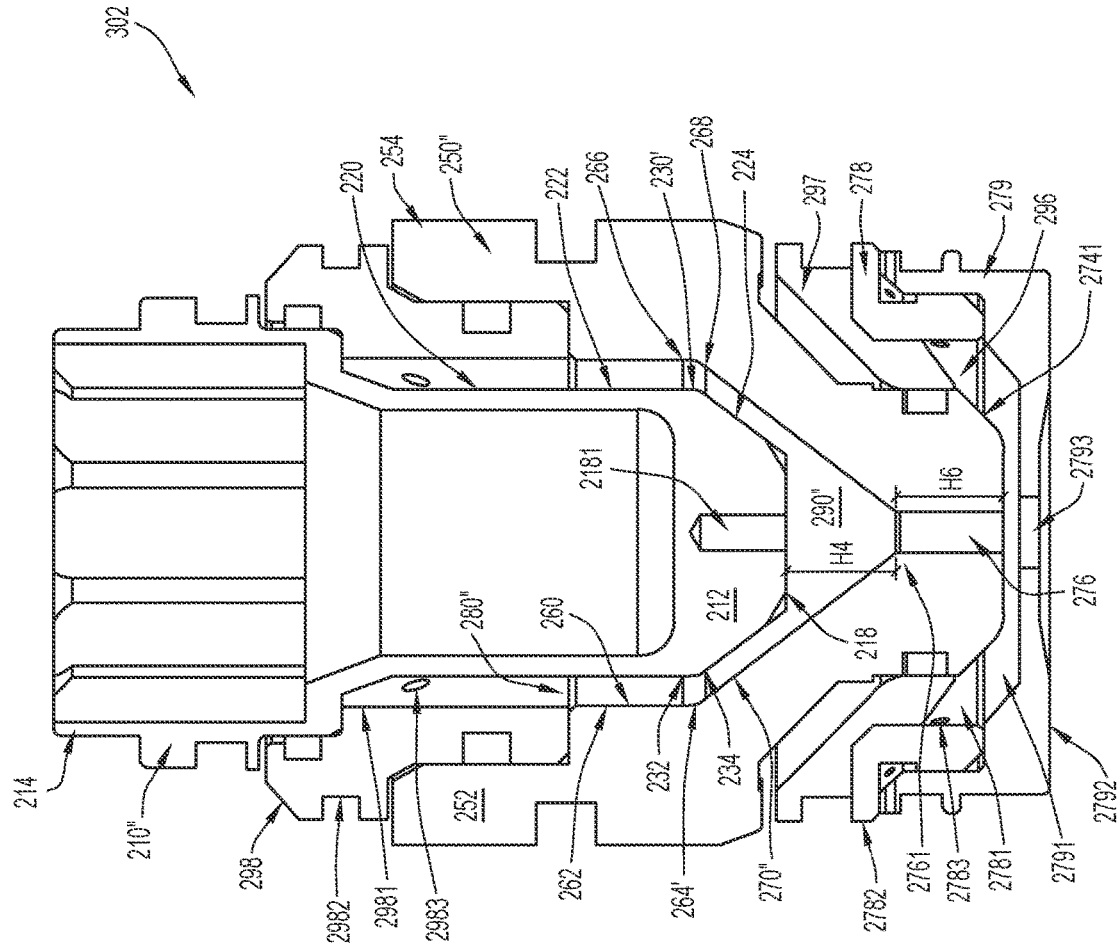
FIG. 8 is a sectional view of a full consumable stack according to a third example embodiment of the present disclosure.

Now turning to FIGS. 7 and 8, the figures illustrate second and third example embodiments of consumable stacks incorporating the features described herein. In particular, FIG. 7 illustrates consumable stack 301 while FIG. 8 illustrates consumable stack 302. Consumable stack 301 and consumable stack 302 are substantially similar to consumable stack 200 and, thus, for brevity, only differences between these embodiments are described in detail below (with different structural features being labeled with new part numbers or prime part numbers in the figures). However, any description consumable stack 200 should be understood to like aspects of consumable stacks 301 and 302 (e.g., parts labeled with the same part numbers) and the descriptions of consumable stacks 200, 301, and 302 are not intended to limit the consumables presented herein in any manner. Instead, consumable stacks 200, 301, and 302 are presented and described herein to provide non-limiting examples of consumables incorporating the features that are presented herein.

With that said, in FIG. 7, the consumable stack 301 only includes an electrode 210' and a nozzle 250' that are largely similar to electrode 210 and nozzle 250. Two of the main differences between these embodiments, if not the only differences, are the height of the emissive insert catcher and a length of a curved portion of the plasma channel. First, in consumable stack 301, the elongated plasma chamber 290' still has a height H4 (and, thus, orifice 276 still has a height H6), but the elongated plasma chamber 290' of consumable stack 301 has an emissive insert catcher 292' that is shorter that the emissive insert catcher 292 of consumable stack 200. That is, the emissive insert catcher 292' has a height H8 that is smaller than H5 (see FIG. 4). For example, height H8 may be in the range of 0.030 in. to 0.080 in., such as approximately 0.060 in.

Second, in consumable stack 301, the transition portion 230' of the external surface 220 of the electrode 210' and the rounded section 264' of the inner surface 260 of the nozzle 250' have a radius R3 that is smaller than the radii R1 and R2 of the like portions depicted in FIG. 3. For example, radius R3 may be in the range of 0.050 in. to 0.125 in., such as approximately 0.05 in. This shortens the overall length of the curved portion of the plasma channel 280' defined by transition portion 230' and the rounded section 264' (thereby lengthening the tapered portion of the plasma channel 280' defined by the tapered portion 224 of the electrode 210 and the tapered section 270 of the nozzle 250). However, with these dimensions, the plasma channel 280' is still defined by parallel walls that define a constant cross sectional area and encourage smooth flow along the length of the plasma channel 280'. Put another way, the transition portion 230' and the rounded section 264' each still have upstream edges 232 and 262 that provides a tangential transition (i.e., connect tangentially) to longitudinal portion 222 and longitudinal section 262, respectively. Additionally, the transition portion 230' and the rounded section 264' each still have downstream edges 234 and 268 that provide a tangential transition (i.e., connect tangentially) to tapered portion 224 and tapered section 270, respectively.

Meanwhile, in FIG. 8, the consumable stack 302 includes more components than are shown in consumable stack 200 or consumable stack 301, but still includes at least a portion, if not all of, the advantageous features described herein. For example, consumable stack 302 includes the electrode 210' from the embodiment illustrated in FIG. 7 and includes a nozzle 250" with an inner surface 260 that mirrors (i.e., runs parallel to) to the external surface 220 of the electrode 210' to define a parallel plasma chamber 280' with a constant cross-sectional area. However, the main difference of this embodiment as compared to the embodiments described above, if not the only difference, is that nozzle 250" does not include a stepped portion to define a emissive insert catcher (e.g., like the stepped portion 272 that defines emissive insert catcher 292). Instead, the tapered section 270 of the inner surface 260 of the nozzle 250 extends directly from the rounded section 264' to the orifice 276.

Consequently, the elongated plasma chamber 290" is defined within the tapered section 270", above a top 2761 of the orifice 276, and beneath the distal end face 218 of the electrode 210'. In the depicted embodiments, the elongated plasma chamber 290" still has a height H4 that is identical to the heights of elongated plasma chambers 290 and 290' and still has a steep lateral boundary wall defined by tapered section 270. However, in other embodiments, the height can differ depending on the taper angle A3 of the tapered section 270".

Typically, nozzles define an emissive insert catcher to limit the amount of an emissive insert that is secreted from the electrode; however, since the features presented herein (e.g., parallel plasma channel, rounded edges, etc.) allow for a reduction in plasma gas pressure through the plasma channel and plasma chamber, emissive insert secretion is reduced with the geometry of the consumables. Thus, this may eliminates the need for an emissive insert catcher, which may reduce the cost of manufacturing the nozzle (since the emissive insert catcher is typically formed with numerous, precise machining operations). Additionally, the elimination of the emissive insert catcher, as shown in FIG. 8, may reduce the number of features on the nozzle that might wear or fail and, thus, may extend the lifespan of the nozzle.

Other than this difference, consumable stack 302 also includes additional components as compared to consumable stacks 200 and 301. In particular, consumable stack 302 includes an insulator 297 disposed between the nozzle 250' and the shield swirl ring 278. Additionally, consumable stack 302 includes a nozzle swirl ring 298 disposed between the proximal end 254 of the nozzle 250' and the proximal end 214 of the electrode 210'. The nozzle swirl ring 298 includes an outer surface 2982 can be aligned with a supply of plasma gas and/or a plasma gas passageway. Additionally, the nozzle swirl ring 298 includes swirl holes 2983 that allow plasma gas to move through the nozzle swirl ring 298, from the outer surface 2982 to an inner surface 2981 of the nozzle swirl ring 298. Thus, the nozzle swirl ring 298 directs plasma gas into the plasma channel 280' and towards plasma chamber 290". However, as mentioned, these components are merely examples of additional components that could be connected to, assembled with, or otherwise used with the nozzles and electrodes presented herein. In other embodiments, any combination of components, whether consumable or non-consumable could be used on combination with the nozzles and electrodes presented herein (or other nozzles and/or electrodes including the features presented herein).

As demonstrated herein, the consumables presented herein provide a number of advantages. For example, since the consumable stack defines parallel plasma channel with the rounded transitions, the consumable stack may smooth gas flow through the plasma channel. Consequently, plasma gas can be supplied to the consumables at lower pressures than it might be provided to similar consumables without these features (e.g., as compared to consumables that defines corners or edges in a plasma channel). Lower gas pressures may create less wear on the consumables, for example by depleting an emissive insert included in an electrode at a slower rate, and, thus, may increase the lifespan of the consumables. For example, the consumables presented herein may allow for 130 amps (A) cutting at a pressure of 110 pounds per square inch (psi) while many known consumables cutting at 100 A require 90 psi.

Additionally, the lower pressure may decrease gas consumption during cutting, providing further cost savings for a user, among other advantages. Moreover, a steeper and/or elongated plasma chamber may encourage plasma gas to flow downwards to the orifice to assist with shielding and constricting an arc, providing further efficiency enhancements. Thus, the consumables may also improve cut quality and/or cut faster, each of which provides savings in terms of cost and time (cutting faster and/or at higher quality allows more cuts before expiration of the life of a consumable, thereby saving cost and/or time). For example, in at least some embodiments, the consumables presented herein may cut ¾ inch mild steel at a rate in the range of 48 in./minute (min.) to 56 in./min.

While the consumables presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, as mentioned, the consumables presented herein may be modified to connect to or be used with any other desired consumable or non-consumable components, whether to build a unitary cartridge (i.e., a cartridge that cannot be disassembled) or to form a consumable stack from discrete components. Additionally, the consumables presented herein may be suitable for automated (e.g., mechanized) and/or manual (e.g., handheld) cutting.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the consumables described herein, or portions thereof may be fabricated from any suitable material or combination of materials, such as plastic or metals (e.g., copper, bronze, hafnium, etc.), as well as derivatives thereof, and combinations thereof.

Finally, when used herein, the term "comprises" and its derivations (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc.). For example, the term "approximately" may denote a tolerance of plus or minus 0.002 inches, 0.001 inches, or up to 0.005 inches. The same applies to the terms "about" and "around" and "substantially."

I claim:

1. A set of consumables for a plasma are torch, comprising: an electrode including a main body that extends between a proximal end and a distal end with a distal end face, wherein an external surface of the main body includes: a longitudinal portion that is substantially parallel to a longitudinal axis of the electrode; a tapered portion that has a constant taper angle and extends between the longitudinal portion and the distal end face; and a transition portion that connects the tapered portion to the longitudinal portion while providing a smooth, rounded transition between the longitudinal portion and the tapered portion; and a nozzle that is installable around the electrode, the nozzle including a main body defined, at least in part, by an outer surface and an inner surface, the inner surface being disposed opposite to and mirroring the tapered portion of the electrode, the transition portion of the electrode, and at least a portion of the longitudinal portion of the electrode to define a plasma gas channel therebetween with a gap that has a constant dimension defined by parallel, wherein the plasma gas channel defined between the nozzle and the electrode is a single volume channel.

2. The set of consumables of claim 1, wherein the tapered portion is a truncated cone.

3. The set of consumables of claim 1, wherein the constant taper angle in a range of 45 to 80 degrees.

4. The set of consumables of claim 1, wherein the tapered portion connects to the distal end face at a hard edge.

5. The set of consumables of claim 4, wherein the hard edge further comprises radial grooves spaced around a circumference of the hard edge, the radial grooves providing a secondary taper between the tapered portion and the distal end face.

6. The set of consumables of claim 1, wherein the transition portion has a constant radius in a range of 0.050 inches to 0.125 inches.

7. The set of consumables of claim 1, wherein an upstream edge of the transition portion provides a first tangential transition to the longitudinal portion and a downstream edge of the transition portion provides a second tangential transition to the tapered portion.

8. The set of consumables of claim 1, wherein the inner surface of the nozzle comprises:
a longitudinal section;
a rounded section; and
a tapered section, wherein when the nozzle is installed around the electrode, the longitudinal section of the nozzle is longitudinally aligned with the longitudinal portion of the electrode, the rounded section of the nozzle is longitudinally aligned with the transition portion of the electrode, and the tapered section of the nozzle is longitudinally aligned with the tapered portion of the electrode.

9. The set of consumables of claim 8, wherein the tapered portion defines a truncated cone and the constant taper angle is in a range of 45 to 80 degrees.

10. The set of consumables of claim 8, wherein the tapered section of the nozzle extends beyond the distal end face of the electrode to define an elongated plasma chamber therebetween.

11. The set of consumables of claim 10, wherein the nozzle further comprises an orifice and the tapered section extends directly to the orifice, the elongated plasma chamber being defined between a top of the orifice and the distal end face of the electrode.

12. The set of consumables of claim 10, wherein the nozzle further comprises:
an orifice; and
a stepped portion that defines an emissive insert catcher, wherein the stepped portion is disposed between the orifice and the tapered section so that the tapered section extends directly to the stepped portion and the elongated plasma chamber is defined between a bottom of the emissive insert catcher and the distal end face of the electrode.

* * * * *

UNITED STATES PATENT AND TRADEMARK OFFICE
CERTIFICATE OF CORRECTION

| | | |
|---|---|---|
| PATENT NO. | : 11,974,384 B2 | |
| APPLICATION NO. | : 16/885339 | |
| DATED | : April 30, 2024 | |
| INVENTOR(S) | : Jacob Farnham | |

It is certified that error appears in the above-identified patent and that said Letters Patent is hereby corrected as shown below:

In the Claims

Column 15, Line 30, Claim 1, change "are torch" to --arc torch--; and
Column 15, Line 48, Claim 1, after "parallel", insert --surfaces--.

Signed and Sealed this
Fourth Day of June, 2024

Katherine Kelly Vidal
*Director of the United States Patent and Trademark Office*